Sept. 14, 1948.    V. GUILLEMIN, JR    2,449,067
CONSTANT FLOW GAS ANALYZER
Filed July 29, 1946
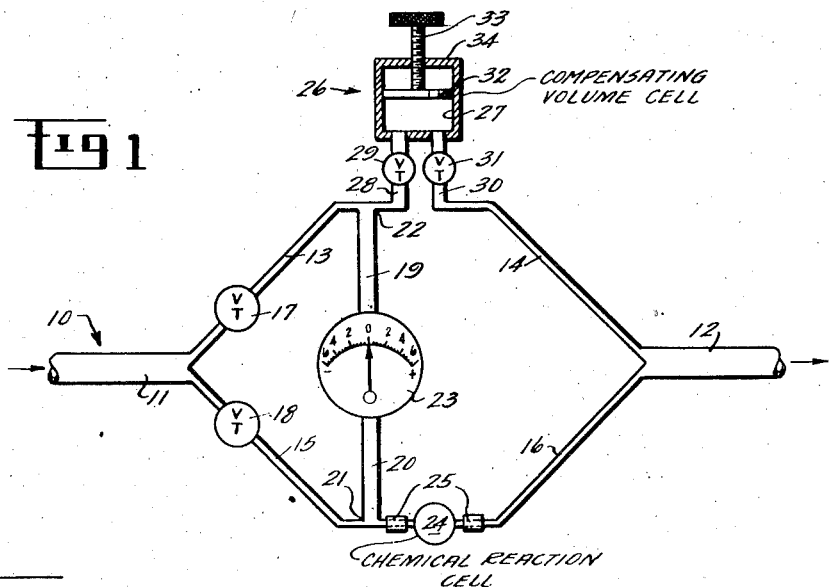
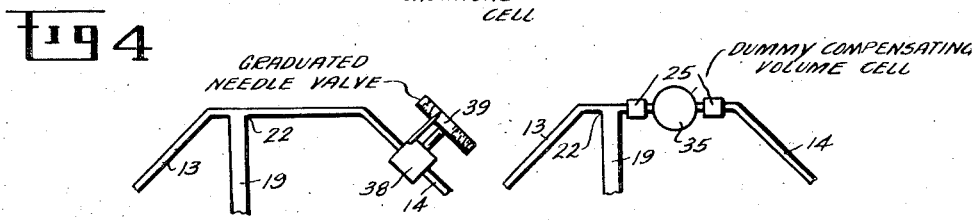
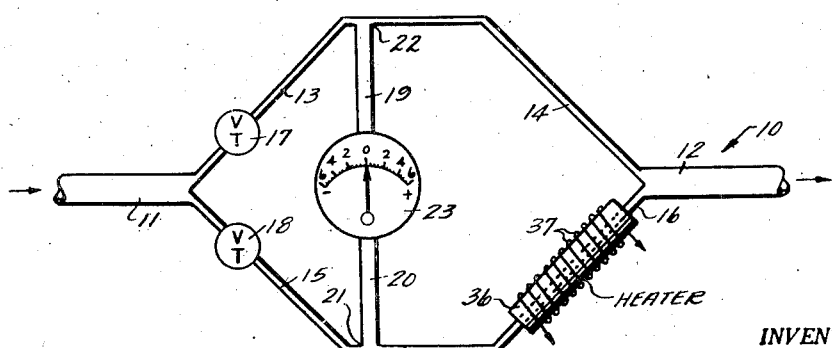
INVENTOR.
VICTOR GUILLEMIN JR.

Patented Sept. 14, 1948

2,449,067

UNITED STATES PATENT OFFICE 2,449,067

CONSTANT FLOW GAS ANALYZER

Victor Guillemin, Jr., Dayton, Ohio

Application July 29, 1946, Serial No. 686,834

3 Claims. (Cl. 73—23)

(Granted under the act of March 3, 1883, as amended April 30, 1928; 370 O. G. 757)

The invention described herein may be manufactured and used by or for the Government for governmental purposes without payment to me of any royalty thereon.

This invention relates to a continuous-flow type fluid analyzing apparatus and more particularly to one in which a fluid passing therethrough is divided into two portions one of which is subjected to a physical or chemical alteration that effects its flow resistance. The resulting change in fluid pressure is indicated or recorded by a suitable gauge whose deflections are a quantitative measure of the properties of the fluid involved in the alteration.

In an alternative method of operation, the change in flow resistance produced by the physical or chemical alteration is compensated by a manually operated resistance altering means, the gauge then functioning as a "null" meter to indicate when compensation has been attained. The compensating means is calibrated and its movement is the quantitative measure of the fluid property being determined.

For example, in the case of a fluid consisting of a mixture of gases, the alteration could be the absorption of one of the components, and the gauge reading could represent the proportion of that component in the mixture. Or again, the fluid might be lubricating oil and the alteration a change of temperature, and the gauge could be made to indicate the temperature coefficient of viscosity of the oil.

The present invention comprises a fluid conducting circuit resembling the electrical Wheatstone bridge circuit in which one side of a differential pressure responsive indicating means connects the juncture of two flow tubes in one flow passage and the other side of the differential pressure responsive indicating means connects the juncture of two flow tubes in the other flow passage, analogous to the arrangement of the galvanometer in the Wheatstone bridge circuit, that is indicative of any change in flow resistance in a flow tube corresponding to the arm containing the unknown electrical resistance of the Wheatstone bridge circuit from which certain fluid characteristics may be determined. One important feature of the present invention is that pressure variations resulting from the changes in question are indicated on a single gauge. It may therefore be made direct reading, requiring no computations to attain the desired values. Another important feature is that the gauge is affected only by the pressure differences produced by the physical or chemical changes and not by the total pressure driving the fluid through the apparatus. This makes it possible to achieve very high sensitivity. For example, with a pressure of 100 pounds per square inch applied across the apparatus, the indicating gauge can be chosen to measure pressures as low as 1/100 pounds per square inch. Thus changes of the order of one part in 10,000 can be measured.

Many devices are known in which a change in the properties of a fluid is recorded as a change in the flow resistance. These are, however, all of the type in which the flow resistance before and after the change is measured respectively by one of two separate gauges. These devices are therefore more complicated than the present invention. They are not inherently direct reading, and, what is more important, the gauges read the total pressures acting on the fluid and it is therefore not possible to achieve the high degree of sensitivity required for precise analysis without resorting to complicated and costly pressure indicating devices.

The primary object of this invention is the provision of a continuous-flow type fluid analyzing apparatus from which certain characteristics of a fluid flowing therethrough may be determined.

Another object of this invention is to provide a continuous-flow type fluid analyzing apparatus wherein certain fluid characteristics may be deduced from the indications of a pressure differential indicating means connected between two fluid flow paths of a divided fluid conduit in which at least one fluid flow path includes a fluid altering means.

A further object of this invention is to provide an apparatus for quickly and accurately analyzing fluids by the use of a single pressure differential indicating means connecting two flow passages in a divided portion of a fluid conduit intermediate flow control means upstream and a fluid altering means downstream being located in one flow passage, and a flow control means upstream and a volume compensating means with inlet and outlet flow control means downstream being located in the other flow passage wherein certain characteristics of the fluid passing through the conduit may be determined.

A still further object of this invention is the provision of a continuous-flow type fluid analyzing apparatus in which the determination of certain characteristics of fluid flowing therethrough may be quickly and accurately determined by the use of single pressure differential indicating means connecting a junction of two flow tubes in each of two flow passages of a divided fluid conduit in which each of the upstream flow tubes include flow control means, one downstream flow tube of which includes a fluid altering means and the other downstream flow tube includes a volume compensating means and a graduated flow resistance compensating means.

Other objects and advantages will become apparent as the description proceeds taken in conjunction with the accompanying drawing wherein simple embodiments are shown diagrammatically to illustrate the invention, in which:

Fig. 1 is a diagrammatical representation of the apparatus exemplifying the subject invention;

Fig. 2 is a diagrammatical representation of another embodiment of the invention;

Fig. 3 is a partial diagrammatical representation of a removable volume compensating cell for a flow passage of the apparatus; and Fig. 4 is a partial diagrammatical representation of a graduated flow resistance compensating device for a flow passage of the apparatus.

Describing the invention more in detail, with reference particularly to Fig. 1, there is shown diagrammatically a fluid conduit 10 having a fluid inlet portion 11 and a fluid outlet portion 12 separated by a fluid conducting divided portion forming two flow passages of first and second flow tubes 13 and 14, 15 and 16, respectively. The first flow tubes 13 and 15 of each flow passage have adjustable needle valves 17 and 18, respectively, therein for controlling the resistance to fluid flow through the respective flow tubes 13 and 15. Pressure transmitting conduits 19 and 20 connect the two flow passages at the junction of the first and second flow tubes 13 and 14, and 15 and 16, respectively, at 21 and 22.

A differential pressure responsive indicator 23 is in operative communication with the pressure transmitting conduits 19 and 20. This indicator may be a differential pressure gauge, manometer, a recording pressure device, or any other desirable pressure responsive indicating means but is illustrated herein for simplicity as merely a differential pressure gauge.

In one flow passage 15—16 there is an absorption cell 24, or any suitable reaction cell, arranged at the entrance to the second flow tube 16, as shown, adapted to be detachable as by rubber coupling 25 arranged to slip over the ends of the flow tube 16 and the conduit for the absorption cell 24 in the well known manner. The absorption cell 24 may be filled with suitable chemicals for absorbing certain fluids of a fluid mixture to be analyzed.

In practice, because of difference in volume in the two flow passages 13—14 and 15—16 caused by the absorption cell 24, there will be transient unbalanced pressures whenever there is a change of flow. In order to maintain equal volumes in the two flow passages 13—14 and 15—16, to avoid unnecessary surges upon admitting or shutting off fluid to the apparatus, there is included in the other flow passage 13—14 an adjustable compensating volume cell, generally designated by the reference character 26, arranged at the entrance to the flow tube 14, as shown. The compensating volume cell 26 comprises a member with a cylindrical bore 27 having an inlet conduit 28, with an adjustable needle valve 29 therein, and an outlet conduit 30, with an adjustable needle valve 31 therein, connected to the flow tube 14 such that fluid flowing into the flow tube 14 must pass through the adjustable compensating volume cell 26. A piston 32 is adjustably reciprocable in the cylinder 27 by an adjusting screw 33 threadedly cooperative in an upper end wall 34 of the cylinder 27. By regulating the height of the piston 32 in cylinder 27 the volume of the compensating cell 26 can be regulated to balance the volume of the absorption cell 24. The flow resistance through the compensating cell 26 may be varied by the needle valves 29 and 31 to match the resistance of the absorption cell.

Where it is desirable to use matched absorption and volume cells a detachable dummy volume cell 35 may be arranged in place of the compensating cell 26, as illustrated in Fig. 3, and attached in the same manner as the absorption cell 24 is attached to the flow tube 16. The compensating volume cells 26 or 35 have no effect on fluid flowing therethrough except to compensate for the absorption cell 24 with regard to volume and flow resistance.

The embodiment shown in Fig. 2 is similar in many respects to the embodiment of Fig. 1 in which like reference characters designate like parts and portions. It may be noted in this figure that the flow tube 14 does not necessarily require a volume compensating cell. The flow tube 16, in this form of the invention, is surrounded by an electrical heater element 36 for conducting heat to the flow tube 16 from the heater coil 37.

In Fig. 4, 38 is a graduated needle valve or any other suitable graduated device for altering the flow resistance through flow tube 14. The extent of this alteration may be read on a suitable scale, as shown at 39.

In the actual embodiment of the invention the flow tubes 13, 14, 15, and 16 will normally be fine capillary tubes of, for example, .1 to 1 millimeter bore size that have relatively high resistance to fluid flow, while the parts 11, 12, 19, 20, 24, 26 and 35 have a relatively negligible resistance. Also, the resistances of the four flow tubes 13, 14, 15, and 16 are preferably made nearly alike although the flow through the flow passage 13—14 may be somewhat different than the flow through the flow passage 15—16 without causing detrimental results if the resistance to the flow in the flow tubes 13 and 15 are in the same proportion as the resistance to flow in the flow tubes 14 and 16, respectively, in the initial operating condition.

Suitable means, not shown, must be provided to produce a flow of fluid from the inlet 11 to the outlet 12 and to adjust this flow to any desired value and to maintain this flow, or the total pressure differential between inlet 11 and outlet 12, constant, either automatically or by manual adjustment.

In operation of Fig. 1 let it be assumed, by way of example, that a mixture of a gas A and gas B is to be analyzed for gas A content. The cell 24 is charged with a substance which absorbs one of the gases, say A, but not B. By any suitable means, pure gas B is passed through the apparatus, and the flow is adjusted until the pressure differential between inlet 11 and outlet 12 has the desired value. This pressure differential is maintained constant throughout all subsequent operations. The resistances of the flow tubes 13 and 15 are adjusted by the needle valves 17 and 18 until they are in the same proportion as the resistances of flow tubes 14 and 16, including the absorption cell 24 and compensating cell 26 or 35. This "balanced" condition will be indicated by 0 pressure difference across the gauge 23. If now the unknown mixture of gases A and B is introduced into the fluid conduit 10 at 11, the gas A will be absorbed in the absorption cell 24 and the flow of gas through the flow tube 16 will be less than the flow through the flow tube 15. The flow through flow tubes 13 and 14 will, however, remain unchanged. Therefore, the pressure at the junction 22 of flow tubes 13 and 14 will not be altered, but the pressure at the junction 21 of flow tubes 15 and 16 will be lowered by an amount depending on the proportion of gas A in the mixture. The pressure in the flow passage 13—14 at the junction 22 is transmitted to one side of the pressure differential gauge 23 by the pressure transmitting conduit 19 and the pressure now existing in the flow passage 15—16 at the junction 21 is transmitted to the other side of the pressure differential gauge 23 by the pressure transmitting conduit 20 to cause registration on the pressure differential gauge which difference in pressure between the junction points 21 and 22 will give a negative reading denoting a lower pressure at the junction 21 than at the junction 22. By proper calibration of the gauge 23, with known mixtures of gases A and B, a scale may be constructed for this gauge to indicate directly the proportion of gas A in any given unknown mixture.

The apparatus of Fig. 2 may be used to measure the change of viscosity of a fluid due to very slight changes of temperature. With the heater 36 inoperative, a suitable flow of fluid is established through the apparatus, and the initial "balanced" condition is obtained as in the operation of Fig. 1. When the heating element is made operative, the viscosity of the fluid, while flowing through the flow tube 16, will be altered, and the pressure at the junction 21 of flow tubes 15 and 16 will be changed. The deflections of the gauge 23 will be a measure of this change. The temperature difference between the fluid in flow tubes 13, 14, 15, and 16 may be determined by thermocouples or any other suitable means. With constant predetermined temperatures in the flow tubes 13, 14, 15, and 16, the gauge 23 may be designed to read temperature coefficient of viscosity directly.

The present invention may also be operated as a "null" instrument instead of a direct indicating instrument by addition of the parts shown in Fig. 4. In this method of operation, the gauge 23 is balanced under all conditions of operation. This is accomplished by actuating the graduated needle valve 38 thereby altering the flow resistance through flow tube 14 by a known amount sufficient to compensate for the change of flow resistance through flow tube 16 caused by such devices as 24 or 36, compensation being complete when the gauge 23 indicates 0. The known extent to which the flow resistance through flow tube 14 must be altered to bring the gauge 23 back to zero or "null" position, after it has been deflected, is read on the graduated scale 39 and is then a measure of the fluid alteration that is being investigated. This method of operation, while less convenient than the direct reading method, has the advantage that the "null" adjustment is independent of the rate of flow of fluid through the apparatus.

In the interest of obtaining the greatest possible accuracy the fluid analyzer apparatus may be placed in a chamber, or in a water tank, such that air currents varying in temperature will not affect the viscous characteristics of the sample being tested where not intended. Further, larger capillary tubes may be used for liquids than for gases, where desirable, to lessen the chance of error due to slight temperature changes of the apparatus altering the viscosity of the sample fluid.

It is understood that the parts shown in Figures 1, 2, 3, and 4 may be rearranged and combined in various ways without departing from the scope of this invention. For example, one type of fluid altering means might be arranged at the entrance of flow tube 14 and another fluid altering means be arranged simultaneously at the entrance of flow tube 16.

The apparatus of this invention may be used to give continuous indication and record of such varied quantities as the per cent impurities of the output of commercial gas manufacturing plant or the temperature coefficient of viscosity of lubricating oil. It could, of course, be made to give an alarm when the indicated quantities exceeds a predetermined maximum. More generally, the apparatus is capable of indicating, measuring, and recording any physical or chemical change of a fluid which affects flow resistance.

The present invention is not limited to the diagrammatical details set forth as illustrated since numerous modifications may be effected therein without departing from the spirit and scope of the invention but is desired that only such limitations be imposed as indicated in the appended claims.

I claim:

1. A fluid analyzing apparatus comprising, a fluid conduit divided into two flow passages in a portion thereof, each of said flow passages being divided into first and second flow tubes through which fluid is adapted to flow successively, said conduit having a means operatively associated with one of said flow passages for producing a change of flow resistance in said second flow tube of said one flow passage, a manually adjustable volume compensating means in the other flow passage for equalizing the volume in the said second flow tube of said other flow passage with the volume in the said second flow tube of the said one flow passage including the said first mentioned means to prevent sudden surges of fluid flowing through said fluid conduit from altering the proportional flow in said two flow passages, and a pressure responsive indicating means connecting the two said flow passages at the junction respectively of the said first and second flow tubes for indicating the pressure differential between said flow passages resulting from a change of flow resistance upon operation of said first mentioned means.

2. A fluid analyzing apparatus comprising, a fluid conduit divided into two flow passages in a portion thereof, each of said flow passages being divided into first and second flow tubes through which fluid is adapted to flow successively, flow control valves in the first flow tube of each of said flow passages for individually controlling the fluid flow through each said flow passage, means at the entrance of the second flow tube of one of said flow passages operative for producing a change of flow resistance through said last mentioned second flow tube, an adjustable manually controllable volume compensating cell and a flow resistance compensating means associated with the second flow tube of the other of said flow passages for maintaining equal volume in said two flow passages to prevent any proportional change in flow resistance upon a change in flow and for compensating the change of flow resistance produced in the second tube of the said one flow passage by said first mentioned means, respectively, said flow resistance compensating means having an indicator thereon for registering the degree of compensation for resistance and a pressure responsive indicating means connecting the two said flow passages at the junction respectively of the said first and second flow tubes for indicating the pressure differential between the two said flow passages.

3. A fluid analyzing apparatus comprising a fluid conduit divided into two flow passages in a portion thereof, said conduit having means operatively associated with one of said flow passages for producing a change of flow resistance in said one flow passage, an adjustable volume compensating means in the other flow passage for maintaining equal volume in said two flow passages wherein sudden surges of fluid passing through said fluid conduit are ineffective to change the proportional flow through said two flow passages, and a pressure responsive indicating means connected across the two said flow passages for indicating the pressure differential between said two flow passages resulting from a change of flow resistance upon operation of said first mentioned means.

VICTOR GUILLEMIN, JR.

REFERENCES CITED

The following references are of record in the file of this patent:

UNITED STATES PATENTS

| Number | Name | Date |
|---|---|---|
| 854,696 | Jones | May 21, 1907 |
| 1,112,432 | Brach | Oct. 6, 1914 |
| 2,139,902 | Malmgren | Dec. 13, 1938 |
| 2,263,335 | Heinz | Nov. 18, 1941 |
| 2,370,817 | Shanley | Mar. 6, 1945 |

FOREIGN PATENTS

| Number | Country | Date |
|---|---|---|
| 329,386 | Germany | Nov. 23, 1920 |
| 375,899 | Germany | June 14, 1923 |
| 396,529 | Germany | June 5, 1924 |
| 486,287 | Germany | Oct. 31, 1929 |
| 570,451 | France | Jan. 16, 1924 |